(12) United States Patent
Mintz et al.

(10) Patent No.: US 11,178,355 B2
(45) Date of Patent: Nov. 16, 2021

(54) SYSTEM AND METHOD FOR GENERATING VISUAL ANIMATION

(71) Applicant: Swaybox Studios, Inc., New Orleans, LA (US)

(72) Inventors: Arthur Mintz, New Orleans, LA (US); Theresa Andersson Mintz, New Orleans, LA (US); Christopher Armand, New Orleans, LA (US); Noah Scruggs, Metairie, LA (US)

(73) Assignee: Swaybox Studios, Inc., New Orleans, LA (US)

( * ) Notice: Subject to any disclaimer, the term of this patent is extended or adjusted under 35 U.S.C. 154(b) by 0 days.

(21) Appl. No.: 16/802,727

(22) Filed: Feb. 27, 2020

(65) Prior Publication Data
US 2020/0204758 A1   Jun. 25, 2020

Related U.S. Application Data

(63) Continuation-in-part of application No. 16/178,658, filed on Nov. 2, 2018, now abandoned, which is a continuation of application No. 15/614,645, filed on Jun. 6, 2017, now Pat. No. 10,148,904.

(60) Provisional application No. 62/811,419, filed on Feb. 27, 2019.

(51) Int. Cl.
*G11B 27/36* (2006.01)
*H04N 5/7826* (2006.01)
*G11B 27/10* (2006.01)
*H04N 9/82* (2006.01)

(52) U.S. Cl.
CPC ....... *H04N 5/78266* (2013.01); *G11B 27/105* (2013.01); *H04N 9/8227* (2013.01)

(58) Field of Classification Search
None
See application file for complete search history.

(56) References Cited

U.S. PATENT DOCUMENTS

| | | | | |
|---|---|---|---|---|
| 2002/0191109 A1* | 12/2002 | Kriegman | ................ | H04N 9/75 348/587 |
| 2008/0211815 A1* | 9/2008 | Gordon | ................. | G01S 3/7864 345/475 |
| 2012/0038739 A1* | 2/2012 | Welch | ................... | H04N 13/388 348/14.01 |
| 2015/0248198 A1* | 9/2015 | Somlai-Fisher | ...... | G06F 1/1694 715/716 |
| 2016/0045834 A1* | 2/2016 | Burns | ...................... | A63H 3/28 446/268 |

* cited by examiner

Primary Examiner — Eileen M Adams
(74) Attorney, Agent, or Firm — Bechen PLLC; Timothy J. Bechen

(57) ABSTRACT

A method and system provides for generating visual animation, including capturing a first take of a scene with a moveable camera, the first take of the scene including a scene tracking marker disposed within a background set. The method and system includes determining a movement track of the moveable camera during the capturing of the first take of scene and capturing a second take of the scene with a user operating a visual animation object on a moveable platform, capturing the second take using with moving the moveable platform based on the movement track. Therein, the method and system provides for electronically merging, using a computer processing device, the first take and the second take to generate an output scene.

20 Claims, 11 Drawing Sheets

SYSTEM AND METHOD FOR GENERATING VISUAL ANIMATION

RELATED APPLICATIONS

The present application is a Continuation-in-part of, and claims priority to, U.S. patent application Ser. No. 16/178,658 entitled "MULTI-TRACK PUPPETRY" filed Nov. 2, 2018, which is a continuation of, and claims priority to, U.S. Pat. No. 10,148,904 entitled "MULTI-TRACK PUPPETRY" filed Jun. 6, 2017.

The present application relates to and claims priority to U.S. Provisional Patent App. No. 62/811,419 entitled "IMAGE CAPTURE AND INTEGRATION SYSTEM" filed Feb. 27, 2019.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to video capture technology and more specifically to composite output scene generation, integrating multiple captured takes of a scene to generate visual animation.

BACKGROUND

Visual effects are advancing using greenscreen and improved post-processing technology. Although, applied to hand-held camera captures, current technology fails to account for motion and scaling. Hand-held camera technology suffers from a lack of repeatability. For example, when using greenscreen technology, motion of the hand-held camera limits integrating composite shots because of per-shot variances.

The primary limitation of hand-held shots is repeatability shooting multiple takes or shots for a particular scene. Even the most skilled camera operators are unable to capture multiple takes or multiple composites of a scene using the identical camera track. The hand-held camera operator moves the camera in three-dimensional space and even minute variations can damage the fluidity of post-processing integration of composite shots.

The common example of movie making is capturing a background scene. Then separately capturing elements or action within the scene using a greenscreen environment. Via post processing, the elements are integrated into the background scene. Or another technique is electronically generating a background screen for integration with the second capture.

Where a finished scene has multiple elements captured in a greenscreen environment, the integration must account for variances in the multiple scene captures.

The hand-held camera allows for the multidimensional movement, with the captured scene having constant variations of dimensions and angles. This creates an untenable post-processing scenario where it is simply too complicated to account for rotation and scaling when integrating these multiple shots. As the human eye can detect incongruities between shots and elements, precision is required for creating a realistic composite scene. Moreover, accounting for multiple elements (e.g. multiple characters) in the same shot, the problems of integrating these multiple shots grows exponentially. The variances of multidimensional movement, and attempting to account for scaling and rotation in post-processing results in composite scenes having the visual effects falling outside the brain visualization threshold, thus looking choppy or not realistic.

Therefore, there is a need for technique for capturing individual takes of a scene with post-processing integrating variances from hand-held image capture.

BRIEF DESCRIPTION

The present invention provides a method and system for generating visual animation overcoming problems associated with multiple takes of a scene. The method and system includes capturing a first take of a scene with a non-fixed or moveable camera. For example, the take of the scene includes movement of a cameraman holding a handheld camera. The first take of the scene is captured in a background set. Included within the background set is a scene tracking marker, such as resting on the floor or other surface. In one embodiment, the scene tracking marker includes an elongated member arising from a base, with one or more marker elements connected to the elongated member.

The method and system includes determining a movement track based on the movement of the moveable camera during capturing the first take of the scene. This movement track represents how the camera moves during the first take of the scene.

The method and system includes capturing a second take of the scene, during this take a puppeteer manually operates a visual animation object, such as a puppet or puppet element. During the second take, the camera is fixed and the puppeteer is on a moveable stage, such as the stage being rotatable. In one embodiment, the puppeteer and the moveable stage can be ensconced in greenscreen technology.

The movement track can include not only stage movement instructions, but also camera lens adjustment instructions. Examples may include zooming in or out with the camera lens, generating the visual effect of the camera moving closer or further away from the object.

As used herein, the fixed camera may include a stationary camera affixed on a tripod or other stationary structure. The fixed camera may also be attached to a height adjusting mechanism for changing a capture angle. In further embodiments, the camera may be deemed fixed as being secured within a mechanical rig controlling movement sequences. As used herein, fixed camera differs from a handheld camera where the handheld camera includes movements controlled by a camera operator manually handling the camera.

Therein, the method and system includes electronically merging the first take and second take using post-processing techniques. The method and system can include multiple additional takes of visual animation of the animation objects, such as puppet portions. For example, the first take is the background, the second take is a puppet torso and the third take is the puppet head, the torso and head controlled by puppeteer(s) in greenscreen outfits.

Based on movement of the stage and zoom instructions for the camera, the second take having a fixed camera recreates the camera path generated by the moving camera in the first take. By recreating the camera path, further takes of scene(s) with the visual animation objects are seamlessly acquired and then merged via post-processing techniques.

Further embodiments may additional include using puppet tracking markers affixed to portions of the puppet character. These puppet tracking markers facilitate combining the different puppet elements in the post-processing operations merging the various takes of the scene.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

A better understanding of the disclosed technology will be obtained from the following detailed description of the preferred embodiments taken in conjunction with the drawings and the attached claims.

DETAILED DESCRIPTION

The present invention relates to filmed performances of puppetry, with puppeteers moving portions of their character in real time. Multi Track puppetry allows a puppeteer or group of puppeteers to perform different components/portions (body parts or "pieces") of a character/creature separately and at a different time. The computer then puts the various recorded pieces together to create a seamless and unified performance. As just one example, a scene in which a character walks across the street and waves could be performed as a composite of partial scenes as follows: a first puppeteer is recorded performing a scene puppeting only the body and legs of the character; then the same or a second puppeteer is recorded performing the scene puppeting only the left arm of the character; then the same first or second or a third puppeteer is recorded performing the scene puppeting only the right arm of the character; then the same first. Second, or third or a fourth puppeteer is recorded performing the scene puppeting only the head of the character. The recordings of the scenes of the various body parts are then compiled via a computer to create one scene with the whole body of the character. This allows for asynchronous recordings of various portions (including of different scales) of a single bodied character to be combined to form an illusion of a single live recorded character.

Figure 1:
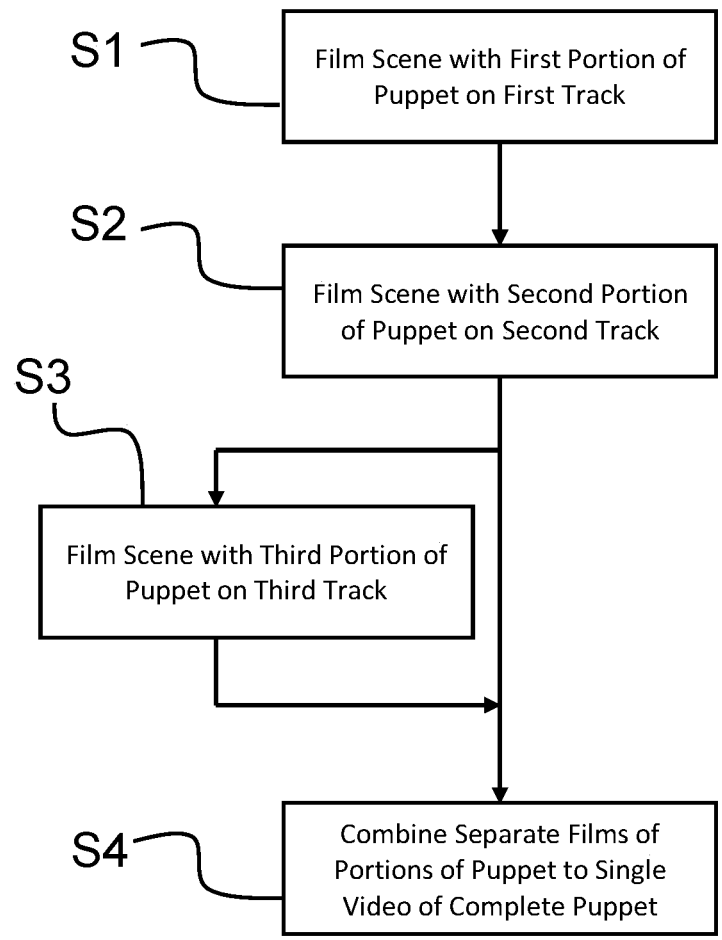
FIG. 1 a flowchart of one embodiment of filming a puppet scene with multiple takes.

Turning now to FIG. 1, a brief description concerning the various components of the present invention will now be briefly discussed. The present invention is related to methods and devices for creating a video 2 of a puppet character 4 comprising a first step S1 of filming a scene 6 of at least a first portion 8 of the puppet character 4 on a first video recording track 10, a second step S2 of filming the same scene 6 including a second portion 12 of the puppet character 4 on a second video recording track 14, preferably a third step S3 of filming the same scene 6 with a third portion 16 of the puppet character 4 on a third video recording track 16, and a fourth step S4 of combining the first video recording track 10 of the first portion 8 of the puppet character 4, the second video recording track 14 of the second portion 12 of the puppet character 4, and preferably the third video recording track 18 of the third portion 16 of the puppet character 4 together onto a single video recording 2 of the scene 6 with an assembled puppet character 4. The video 2 produced can be a single scene 6 or a compilation of multiple sequential scenes 6 lasting one or more seconds long, one or more minutes long, or one or more hours long, as desired, including feature length movies.

Figure 2:
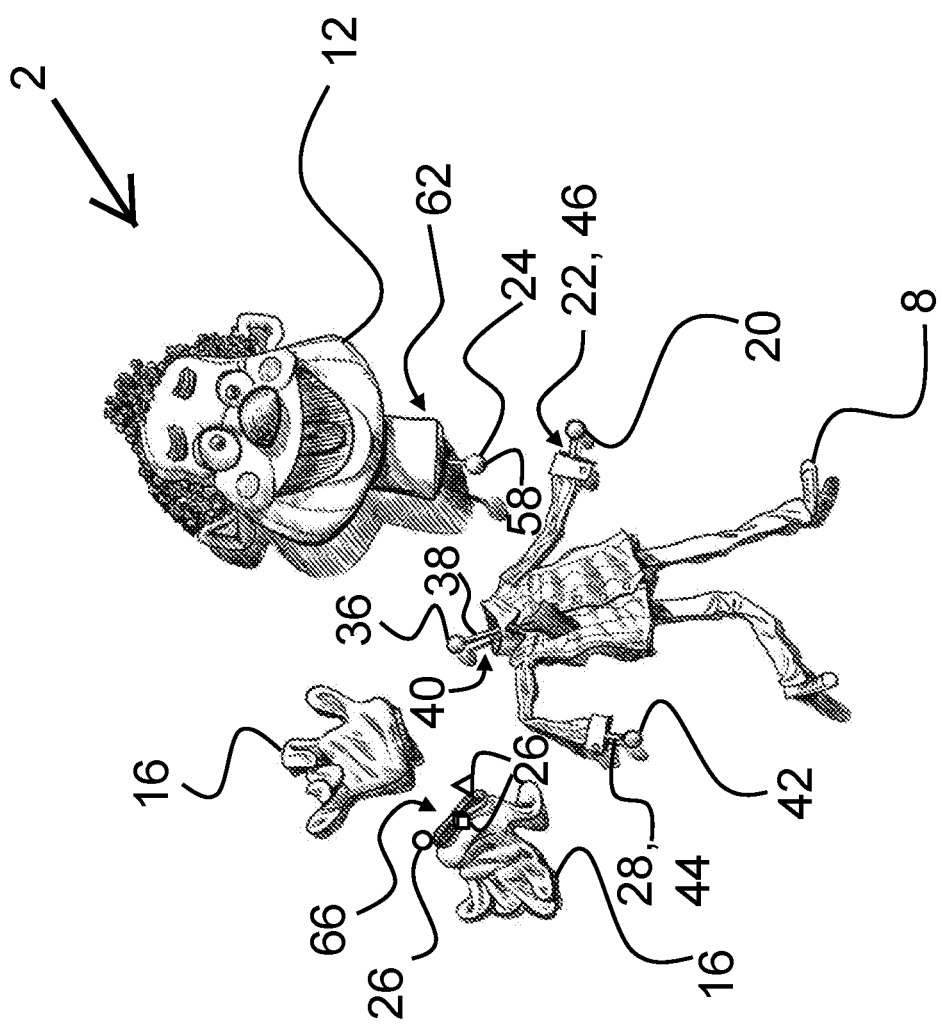
FIG. 2 is a top plan view of a puppet character divided into multiple parts or portions.

Turning to FIG. 2, as can be seen in this embodiment, the puppet character 4 has been split into multiple portions 8, 12, 16. In this embodiment, the first portion 8 of the puppet character 4 is the headless and handless torso, arms, legs and feet. The second portion 12 of the puppet character 4 is the head. The third portion 16 of the puppet character 4 is the two hands. It is to be noted that the third portion is optional, and that further fourth, fifth, sixths, seventh, and further portions and associated filming steps may also be provided.

In this embodiment, the three portions 8, 12, 16 are of different scales. The first portion 8 is about 1:4 scale, or about one fourth the scale of the size the puppet character 4 is depicted as being in the final video 2. The second portion 12 is about 2:1 scale. The third portion 16 is about 3:2 scale. In an alternative embodiment, the different portions 8, 12, 16 of the puppet character 4 may all be of the same scale. In a further alternative embodiment, two, three, four or more of the portions 8, 12, 16 may be of the same scale while one, two, three, four, or more other portion(s) 8, 12, 16 may be of different scale(s).

Each portion 8, 12, 16 preferably has a puppet tracking marker 20 adjacent to a connection location 22. The connection locations 22 are a physical location on a given portion 8, 12, 16 where another portion 8, 12, 16 would connect to the given portion 8, 12, 16 when the puppet character 4 is assembled. The puppet tracking markers 20 may be three dimensional shapes, such as spheres (as shown), cubes, or pyramids, for example. They may also be two dimensional shapes like circles, regular polygons, crosses or unique shapes. Though each portion 8, 12, 16 preferably has a puppet tracking marker 20 adjacent to a connection location 22, the invention may also function with a puppet tracking marker 20 on only one connection location for two complementary connection location 22 or mating portions of puppet characters—such as a hand and a wrist or a head and neck for example.

The puppet tracking markers 20 may be mounted tracking markers 24 as shown or surface tracking markers 26, for example. Mounted tracking markers 24 may be two or three dimensional, and are mounted on extensions 28 that preferably extend away from the puppet portion 8, 12, 16. The extensions 28 may be rods or dowels that are preferably mounted internally in the puppet portion 8, 12, 16 and preferably extend through a central area of the connection location 22. Alternatively or additionally, surface tracking markers 26 may be used, which may be applied on the surface of the puppet character portion 8, 12,16, especially those portions 8, 12, 16 like the gloves in FIG. 4, that are meant to be worn when puppeted. The surface tracking markers 26 may be two dimensional or three dimensional, and are preferably applied in the proximity or directly adjacent to the connection location 22. Multiple surface tracking markers 26 may be used around a perimeter of the connection location 22 to aid in tracking. Additionally, different shaped, sized, or colored puppet tracking markers 20 may be used for different puppet portions 8, 12, 16, or different connection locations 22 on a same puppet portion 8, 12, 16. Additionally, different shaped, sized, or colored puppet tracking markers 20 may be used around a perimeter of a same connection location 22, to aid in three dimensionally orienting the puppet portion 8, 12, 16 during filming.

The various portions of the puppet character's body parts are puppeted, preferably having appropriate tracking markers. The tracking marker is any marker the computer can easily identify for the purpose of marking the connection point of the various components. Examples of tracking markers include small colored sticker, ping pall ball painted certain color, colored plastic pyramids and a wooden stick with a colored dot on it. Some examples of the color are green and hot pink, though other colors could be used, including markers painted with non-visible light wave reflective coverings, such as UV reflective, infrared reflective, microwave reflective, and radio wave reflective coverings. The shape and or the color of the tracking marker should stand out in most or all lighting and be a color and or shape that is easily trackable.

Figure 3:
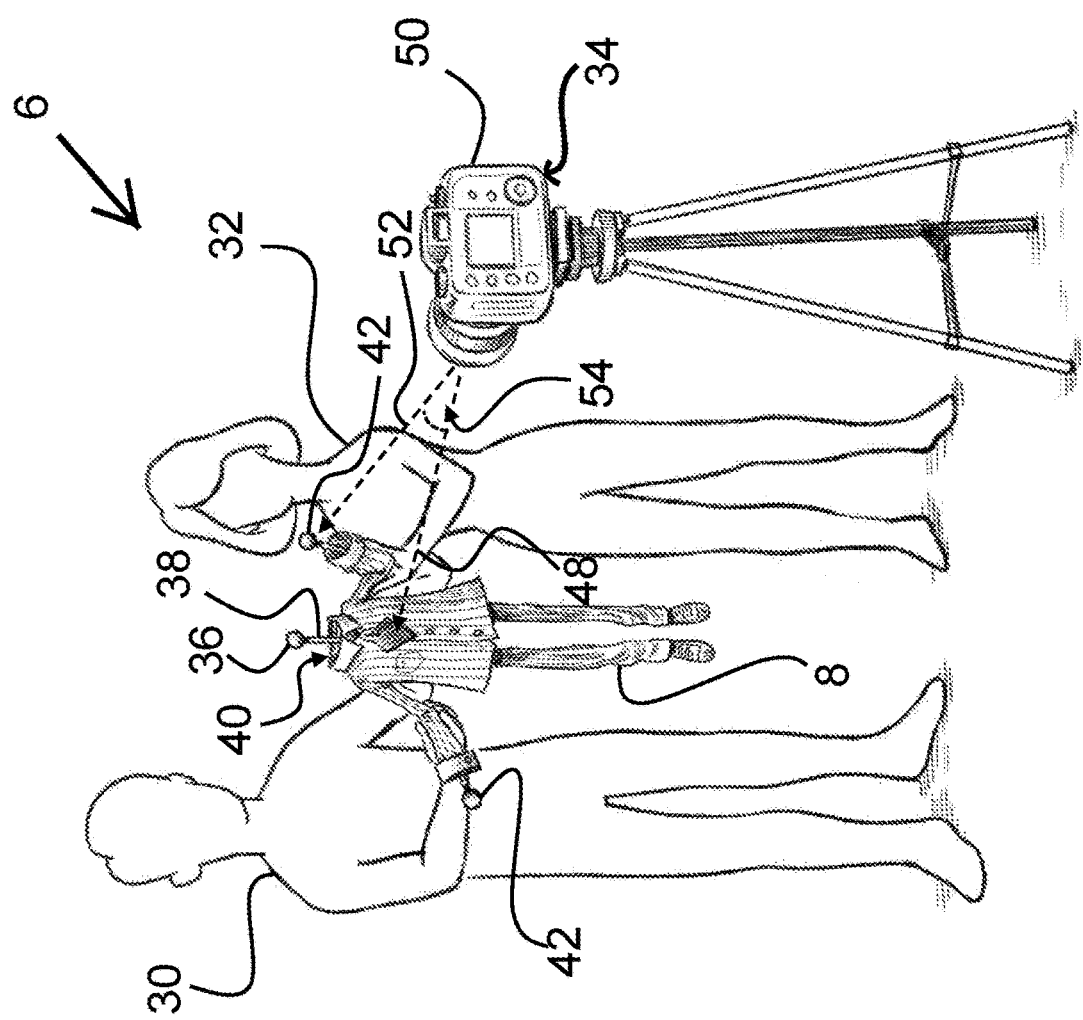
FIG. 3 is a perspective view of a first and a second puppeteer recording a scene with a first portion of the puppet character of FIG. 2.

Turning to FIG. 3-7, an exemplary embodiment of the disclosed multi-track puppeting device and method is shown. In FIG. 3, a first filming step S1 is shown. In this step first and a second puppeteer 30, 32 are shown filming a scene 6 with the first portion 8 of the puppet character 4 on a first recording track 34. This first portion 8 is the torso, arms, legs and feet of the puppet character 4. A first tracking marker 36 is mounted on a first tracking marker extension 38, which is connected to the interior of the first portion 8 of the puppet character 4 and extends through a central area of a primary first connection location 40. The primary first connection location 40 is where the first portion 8 of the puppet character 4 connects to the second portion 12 of the puppet character 4 when the puppet character 4 is assembled in the final video 2. The primary first connection location 40 in the embodiment shown is proximate to where the neck of the puppet character 4 would be. Second tracking markers 42 are mounted on second tracking marker extensions 44, which are connected to the interior of the puppet character 4 and extend through a central area of secondary first connection locations 46. The two secondary first connection locations 46 shown are where the first portion 8 of the puppet character 4 connects to the two third portions 16 of the puppet character 4. The secondary first connection locations 46 in the embodiment shown is proximate to the wrists of the puppet character 4, or where the forearms would connect to the hands. In the embodiment shown, the first portion 8 has three connection locations 22, one primary first connection location 40 and two secondary first connection locations 46, with each connection location 40, 46 having a mounted tracking marker 24. In other embodiments, some or all of the connection locations 22 could have surface tracking markers 26, or no tracking markers.

The scene is preferably filmed in front of a chroma key green screen and the first and the second puppeteers 30, 32 are preferably dressed in a green screen suit or other clothing to allow the background and the two puppeteers 30, 32 to be easily removed or edited out the final video in the combining step. It is understood that various colored or types of chroma key type backgrounds and suit may be used as is appropriate. Additionally or alternatively, the scene 6 may be filmed in front of a background to be used in the video, or for example, a filmed background may be combined in the combining step S4.

As shown, the puppeteers 30, 32, while filming the scene 6, preferably remain cognizant of the first portion 8 of the puppet character's 4 location with respect to a central recording axis 48 of the filming camera 50, and of the locations of the primary and secondary first connection locations 40, 46 with respect to the central recording axis 48. The central recording axis 48 is an imaginary line formed by a straight ahead axial view from a center of the lens for the filming camera 50. Also shown is a connection location vector 52 formed by an imaginary line extending from a connection location 22 to the center of the lens for the filming camera 50. The connection location vector 52 shown in FIG. 3 is for the secondary first connection location 46 proximate to the left wrist of the puppet character 4. A connection angle 54 is formed by the angle between the central recording axis 48 and the connection location vector 52, preferably including both the magnitude and direction of the angle from the central recording axis 48. By substantially maintaining a same connection angle 54 for complimentary connection locations 22 between respective filmings S1, S2, S3 of a same scene 6 with different portions 8, 12, 16 of the puppet character 4, visual perspective agreement is maintained for the different portions 8, 12, 16 of the puppet character about the connection locations 22 when the final video 2 is combined, enchaining the realism of the assembled puppet character 6 in the video 2.

Figure 4:
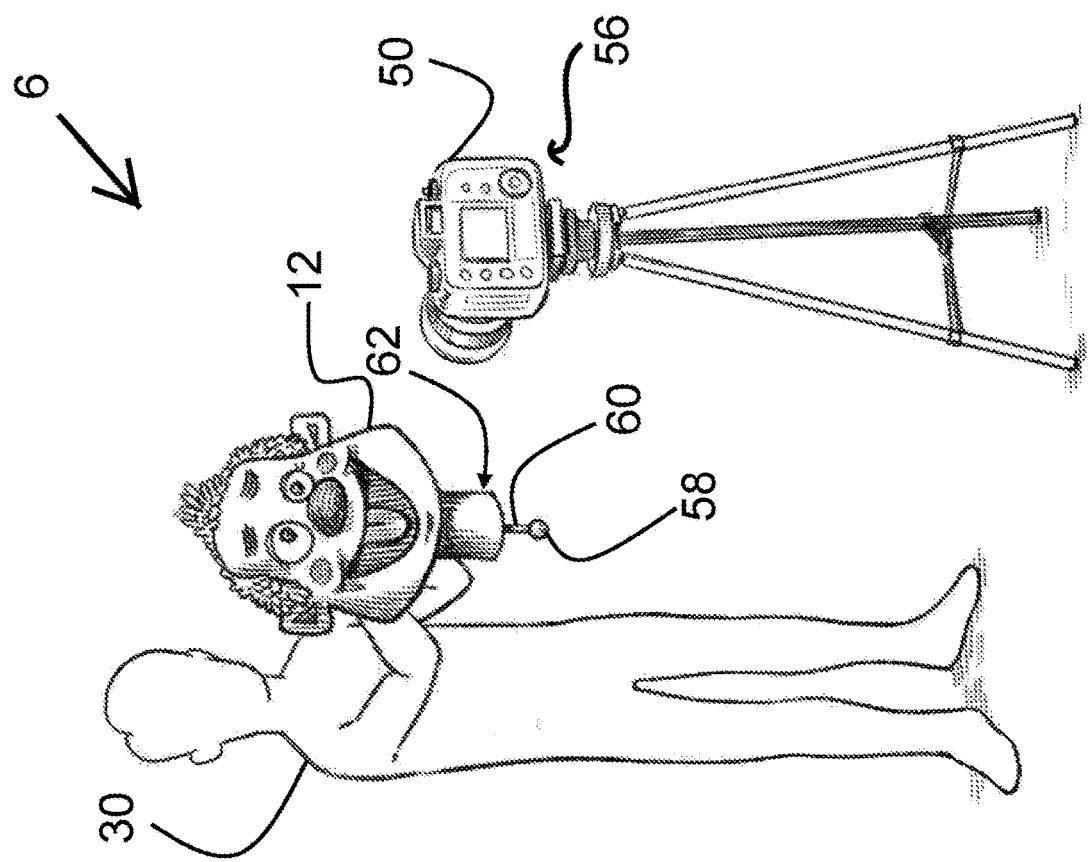
FIG. 4 is a perspective view of the first puppeteer from FIG. 3 recording the same scene of FIG. 3, but with a second portion of the puppet character of FIG. 2.

Turning to FIG. 4, a second filming step S2 is shown. In this step the first puppeteer 30 is shown filming the same scene 6 as in FIG. 3, but with the second portion 12 of the puppet character 4 on a second recording track 56. The second portion 12 in the embodiment shown is the head and neck of the puppet character 4. A third puppet tracking marker 58 is mounted on a third tracking marker extension 60, which is connected to the interior of the second portion 12 of the puppet character 4 and extends from a central area of a second connection location 62. The primary first connection location 40 is where the first portion 8 of the puppet character 4 connects to the second portion 12 of the puppet character 4. The second connection location 62 in the embodiment shown is proximate to the neck of the puppet character 4.

Figure 5:
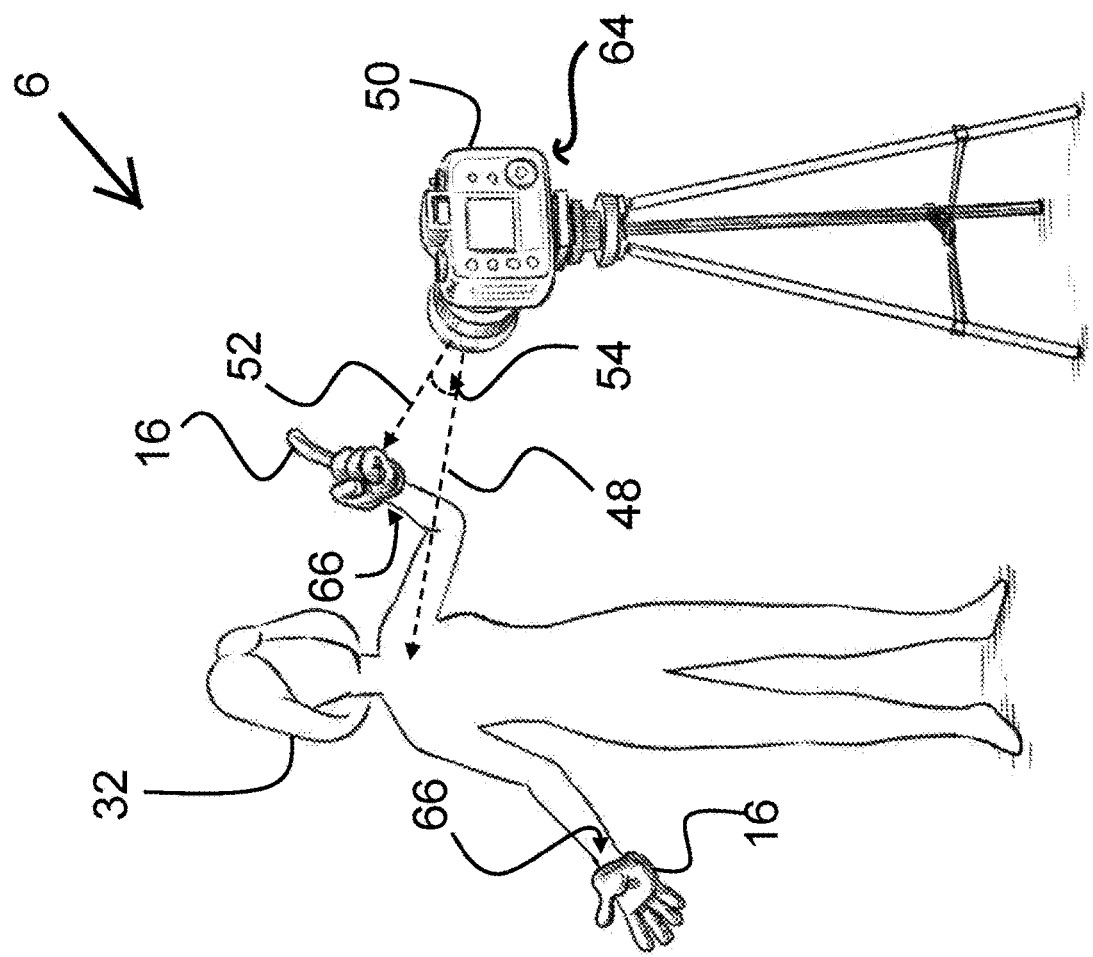
FIG. 5 is a perspective view of the second puppeteer from FIG. 3 recording the same scene of FIG. 3, but with a third portion of the puppet character of FIG. 2.

Turning to FIG. 5, a third filming step S3 is shown. In this step the second puppeteer 32 is shown filming the same scene 6 as in FIGS. 3 and 4, but in this step the filming is with the third portion 16 of the puppet character 4 on a third recording track 64. The third portion 16 in the embodiment shown is the right and the left hands of the puppet character 4. In this embodiment, no puppet tracking marker 20 is mounted on either of the third portions 16, including at third connection locations 66. The third connection location 66 is where the first portion 8 of the puppet character 4 connects to the third portion 16 of the puppet character 4. The third connection location 66 in the embodiment shown is proximate to the wrists of the puppet character 4.

Figure 6:
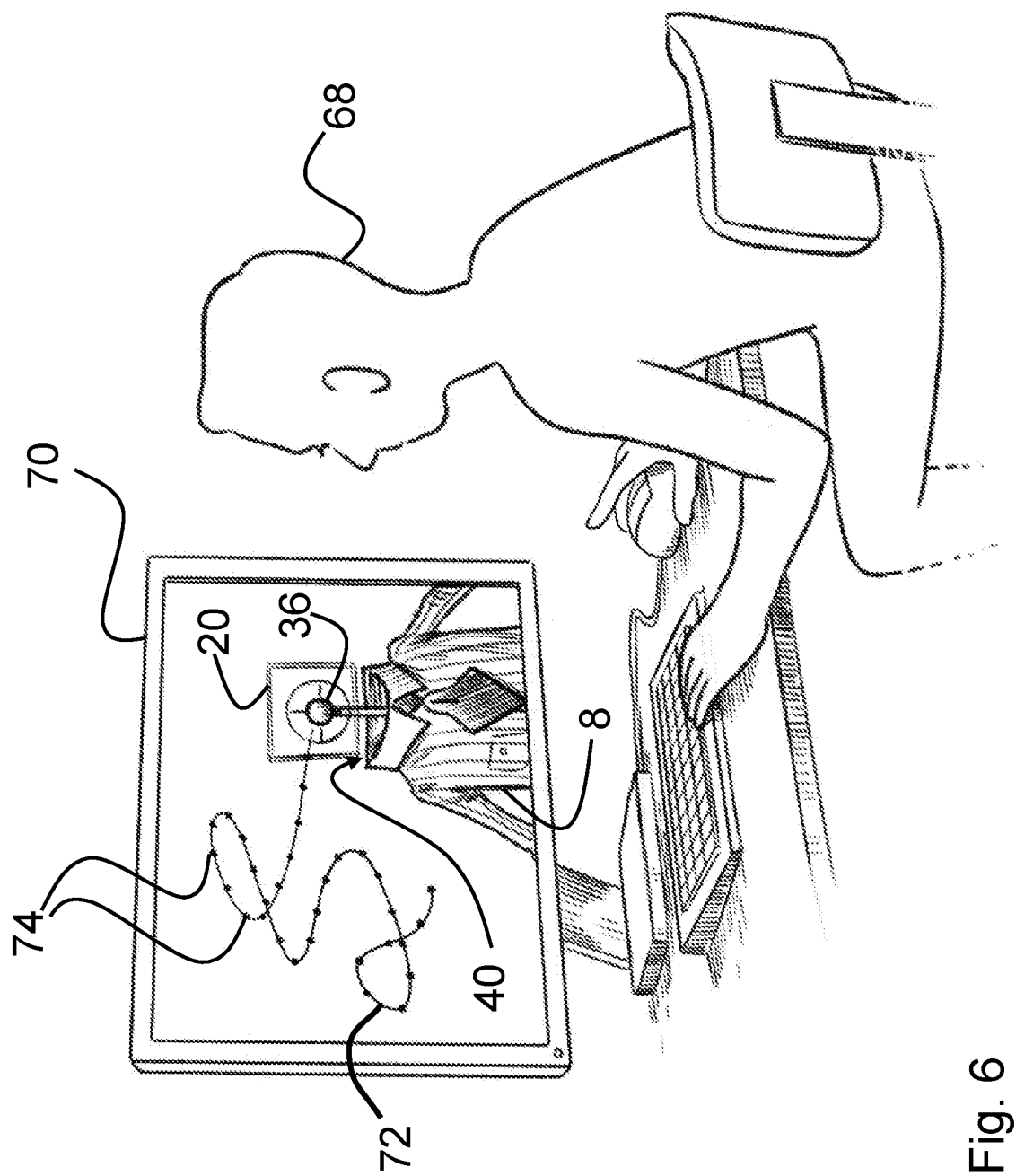
FIG. 6 is a perspective view of an animator combining the recordings from FIGS. 3-5.
Figure 7:
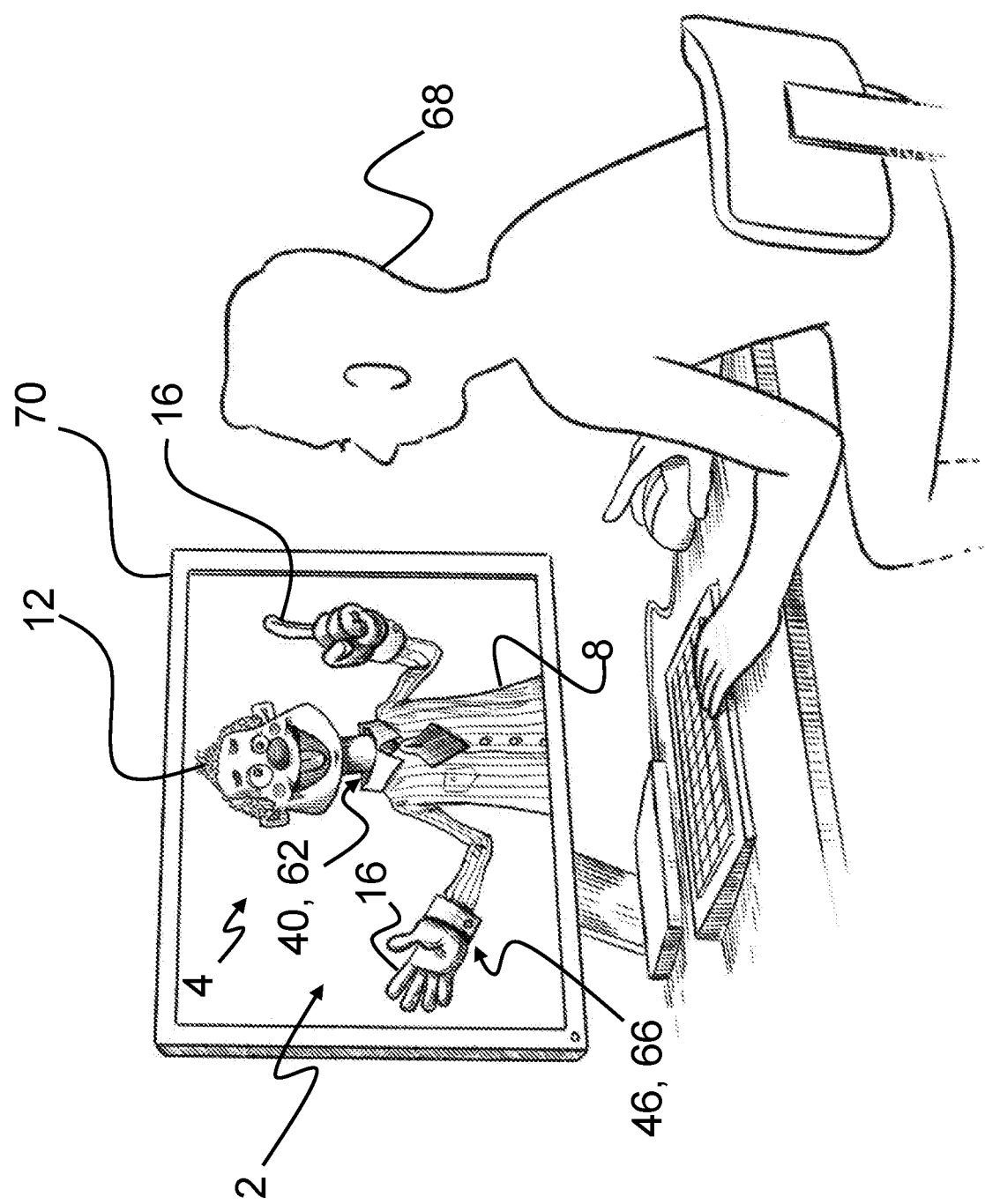
FIG. 7 is a combined video of the recordings from FIGS. 3-5.

Turning to FIG. 6, a fourth combining step S4, and in FIG. 7, the resulting completed puppet character video, is shown. In the fourth combining step S4 an artist 68 or operator combines the first video recording track 10 of the first portion 8 of the puppet character 4, the second video recording track 14 of the second portion 12 of the puppet character 4, and the third video recording track 18 of the third portion 16 of the puppet character 4 together onto a single video recording 2 of the scene 6 with an assembled puppet character 4 (shown in FIG. 7). Using the tracking information captured in the various video recording tracks 10, 14, 18 and a personal computer 70, for example, running visual effects software, the artist attaches the different portions 8, 12, 16 of the puppet characters 4 body parts back together. Some examples of visual effects software with a tracking tool include Astra Effects™, PS Track™, and NUKE™.

In this step S4, in each video recording track 10, 14, 18 the background and puppeteers 30, 32 are extracted or cropped out of the video recording tracks 10, 14, 18 to leave the respective portions 8, 12 16 on the respective video recording tracks 10, 14, 18. The computer 70 then creates a 4D track 72 with frame nodes 74 that correspond to the location of a given tracking marker 20 on each frame of video for a given time period. The thirty-one frame nodes shown in FIG. 6 could represent just over one second of filming, for a 24 frame per second rate of filming. The movement of the portions 8, 12, 16, frame by frame, when properly aligned, gives the impression of smooth and natural movement in the finished video 2. The artist 68 confirms that the 4D track 72 created by the computer 70 is correct, and the artist 68 can edit the location of the frame nodes 74 to align with the true locations tracking markers 20 on each frame. This is referred to as getting a track of the object. The preferable manner is recording a portion 8, 12, 16 that has a puppet tracking marker 20, where the tracking marker 20 is visible all the time. This allow the computer 70 to easily recognize the puppet tracking marker 20 and create the 4D track 72 and the artist 68 to easily confirm the 4D track 72. A more laborious alternative is to manually track a filmed scene of a portion 8, 12, 16. With manual tracking the artist 68 moves preferably frame by frame to manual track the portion 8, 12, 16, "eyeballing" where a tracking marker would be, and assigning a frame node 74 for each frame for the portion, and thereby creating—frame by frame—a 4D track 72.

The puppet tracking marker 20 may have additional shape or size features that help the artist (or computer 70) plot or confirm the 4D track 72 of the portion 8, 12, 16. As shown in the embodiment of FIG. 6, a square frame and inscribed circle and cross may also be mounted on the puppet tracking marker 20. This would give the artist more visual information, more means of checking if the 4D track 72 is accurate. This is another reason that preferably the puppet tracking marker 20 is a color that stands out and is visible in darkness and light.

Then separate portions 8, 12, 16 are layer or joined together to create a whole puppet character 4 at complementary connection locations 22 by aligning the puppet tracking markers 20 for each portion to the tracking nodes 74 on respective 4D tracks 72. A complementary connection location 22 is where two connection locations 22 join, such as the primary first connection location 40 and the second connection location 62 in the embodiment shown. There is preferably a single 4D track for each complementary connection location 22. Alternatively, separate 4D tracks may be created for each puppet tracking marker 20, and then the artist can separately match the frame nodes 74 for the 4D tracks 72 for complementary connection locations 22. Additionally, the computer can automatically match the frame nodes 74 for the 4D tracks 72 for complementary connection locations, and the artist 68 can preferably confirm the computer's 70 matching, and edit as needed.

When a puppet tracking marker 20 physically extends beyond the connection location 20, a connection gap may be factored into the combination step S4, whereby a frame node 74 aligning with a tracking marker will align with a frame node 74 for a complementary tracking marker 20, but will offset the second frame node 74 by a set amount in a set direction—for example the scaled distance the first tracking marker 36 extends beyond the primary first connection location 40 plus the scaled distance the third tracking marker 58 extends beyond second connection location 62, with such gap amount and direction being adjusted by the angle of the two portions 8, 12, 16 to one another.

As stated above, a puppet tracking marker 20 is not necessary for all of the separate portions 8, 12, 16, but greatly expedites the combination step S4 if present. Preferably, at least one of two connecting portions 8, 12, 16 will have a tracking marker 20. Items like gloves, which are worn by puppeteers 30, 32, may not have puppet tracking markers 20. In such circumstances, as described above, the artist 68 will preferably composite the portion 8, 12, 16 manually, that is, for example, will "eyeball" a center of the wrist for the glove when attaching the glove to a frame node 74 or to the wrist of the torso portion 8.

Preferably, a puppet tracking marker 20 is on the negative not the positive. In one embodiment, the puppet tracking marker 20 is only put on the asset or portion 8, 12, 16 the body is being attached to. So if two body parts are being connected, one puppet tracking marker 20 could suffice. A puppet tracking marker 20 for each is preferable though.

As mentioned briefly above, other types of puppet tracking markers 20 may include different type of laser or ultraviolet tracking markers 20, which are preferably visible through a puppeteer's 30, 32 skin or body, such that the camera 50 computer can "see" the tracking marker 20 no matter where the puppeteer's hand or arm is, even if the puppeteer's 30, 32 hand or arm is between the tracking marker 20 and the camera 50. In such embodiments, the puppet tracking marker 20 may be used inside the glove or other worn portions 8, 12, 16. This will allow the camera to track the portion 8, 12, 16 so that the camera can pick up the puppet tracking marker 20 no matter where puppeteer's 30, 32 hand is.

In further embodiments, the puppet tracking marker 20 may reflect or emit a preferably non-visual electromagnetic signal to a detector(s), either through the camera lens, mounted on the camera, or mounted elsewhere in filming area. In one embodiment there can be three or four detectors spaced in the in or near the filming area to triangulate the location of each non-visual electromagnetic signal emitting/reflecting tracking marker 20. In this way, the separate puppet tracking markers 20 may be tracked in three dimensions over time without impeding visually on the take. The tracking data from the separate puppet tracking markers 20 could be compiled in the computer 70 to compute a 4D track 72 for the separate tracking markers 20.

In still further embodiments, the separate puppet tracking markers 20 could contain preferably miniaturized microprocessors, memory, and sensors, including accelerometers and/or 3 dimensional location sensors, for example. In this embodiment, each puppet tracking marker 20 could track and record in memory its own movement through three dimensional space and time. After the puppeteers 30, 32 record the scene 6, and the tracking marker 20 records in memory its location data, the tracking marker's 20 data could be uploaded to the computer 70 and the 4D track 72 for the separate puppet tracking markers 20 could be computed. Additionally or alternatively to having onboard memory, the tracking markers 20 of this embodiment could have wireless transmitting functionality, such as wi-fi or blue-tooth, just for example, and as the scene 6 is being filmed, these puppet tracking markers 20 could just transmit their respective three dimensional locations in real time to sensors or receivers of the camera 50 or additional sensors or receivers, as the scene 6 was progressing. The data would then be loaded into the computer 70 and 4D tracks 72 for the separate tracking markers 20 could be computed, and the portions 8, 12, 16 of the puppet character 4 then combined for final video 2.

The portions 8, 12, 16 may be separately adjusted in size in the computer, with magnifications greater than or less than 1.0, to attain a uniform scale for the whole puppet character 4. This is shown in FIG. 7, where the second portion 12 head of the puppet character 4, though multiple times larger than the first portion 8 torso of the puppet character 4, is resized to be an appropriate size for the first portion 8 torso.

In embodiments when the background is filmed with the portion 8, 12, 16, the puppeteers will be cropped or chroma keyed out and the respective portion and background remain 8, 12, 16, The previously described embodiments and variations of the present invention have many advantages. Some of the advantages of some embodiments include the ability to create a single unitary scaled puppet character of multiple varied scaled portions. This is advantageous if, for example, the puppet character is built to be a 1:6 scale and interact on a 1:6 scale background set, but it is desired to file the puppet character's hands moving and articulating as naturally as someone moving a hand inside of gloves. By separately filming the gloved puppet hands worn and puppeted by a puppeteer, such as in FIG. 5, and then adjusting the scale and adding them to the body, the overall puppet is allowed to be quite small, while still allowing a much higher quality puppeteering of the hands than would be possible otherwise. With the multiple scales of different portions of the puppet character, it is possible to create characters with any proportion and not limited to human armature or anatomy. As stated above, character with apparently tiny hands are possible with hands that are still articulated internally by puppeteers. This allows using and filming an optimal performance size for a given portion of the puppet character, and then rescaling the portion for the combining step and creating the video with a puppet character of unitary scale.

Additionally, by breaking the puppet character into multiple portions, very complex sequences, like a puppet character jumping of a ledge, rolling on the ground, and bouncing up to a walk, for example, become significantly easier by both allowing puppeteers to focus on only a single portion at a time and not requiring that all elements of the puppet character be correct in a single shot. Instead, the hands can be filmed until the hands puppeteer gets the shot correctly puppeted, with the hand puppeteer focusing just on the hands. Then the head can be filmed until the head puppeteer gets the shot correctly puppeted, with the head puppeteer focusing just on the head. As opposed to having 4 to 5 puppeteers manipulating a puppet character for each take, and needing to select a take which is perfect all around. This greatly enhances the separate puppeteers' ability to control the nuance of a performance, and selecting the best take of each portion of the puppet character.

Also, by splitting the puppeting into multiple separately filmed portions, it allows for a reduced number of very talented puppeteers to puppet the entire puppet character. This can be especially advantageous where there are limited numbers of highly talented puppeteers.

Compared with animation, the disclosed invention offers clear advantages in video quality and time requirements. Puppetry is live filmed video that allows high definition and high texture and granularity in appearance. Even though puppetry is a moving inanimate object, the live action film recording offers a visual realism that surpasses animation. Further, even with the embodiments of the disclosed invention using 4D track and combining multiple portions of a puppet character on multiple video recording tracks into a final whole puppet character on a single video, the process can offer significant time advantages over animation, including up to 40 times faster production. The rendering time required to make animated figure approach real life is substantial. With the filmed puppet character though, the texture, lighting, and shadow is instantaneous as soon as the scene is recorded on the camera.

Embodiments of the disclosed technology provide for generating visual animation with capturing a first take (background scene) using a moveable, e.g. hand-held, camera and further takes of the scene using greenscreen technology. The generating of a composite scene of multiple takes accounts for variances in dimensional adjustments between the first take and the further takes of the scene using a tracking marker in the background scene. The present method and system allows for filming and post-processing scenes using puppets and puppeteers, but is also applicable to any other greenscreen filming environment including using actors.

Figure 8:
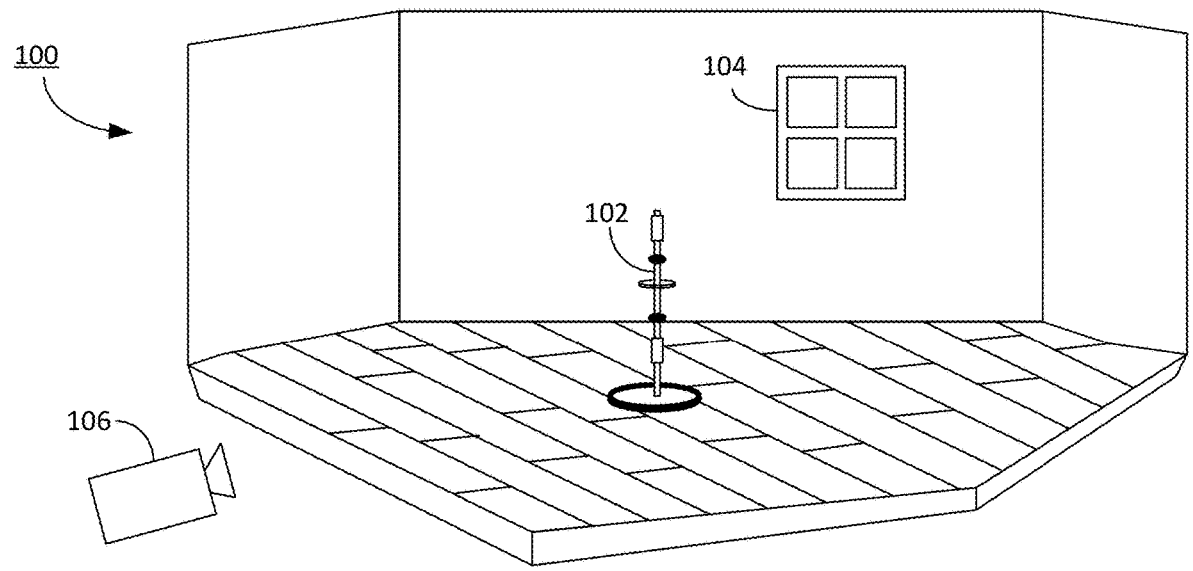
FIG. 8 illustrates background set with a tracking marker disposed therein.

FIG. 8 illustrates a background set 100 including a scene tracking marker 102 disposed therein. In the exemplary set 100, the scene tracking marker 102 sits on a hardwood floor inside a room having a four-pane window 104.

The background set 100 in this example is a room, but it is recognized that the background set may be any suitable background as a scene backdrop. For example, the background can be an outdoor scene, studio scene, or even in one embodiment can be a greenscreen stage digitally inserted in a post-processing environment.

Further noted in FIG. 8, a hand-held camera 106 operates to capture the first take of the scene, also referred to as the background scene. The first take of the scene includes a filming sequence of movements within the set 100 by the camera 106. A user (not shown) operates the camera 106. In another embodiment, the camera 106 can be moved on a track or other automated movement system, such as a mechanical rig.

The scene tracking marker 102 is disposed on the set 100 in a position designated for a subsequent character to be integrated via post-processing. For example, in a finished output scene, also referred to as a composite scene, the animated character can be positioned relative to where the tracking marker sits.

Figure 9:
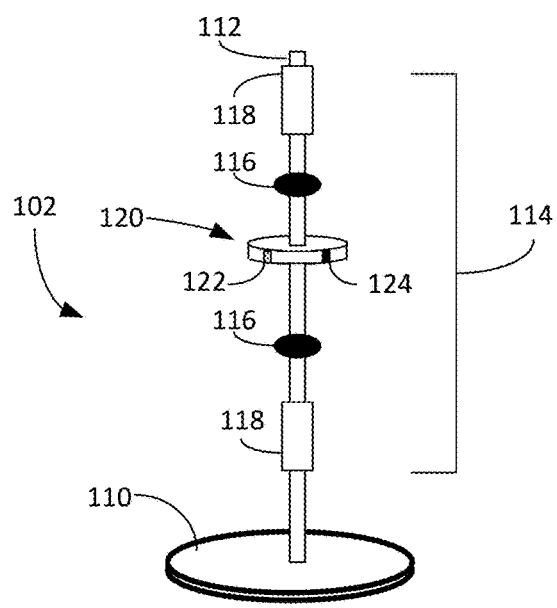
FIG. 9 illustrates one embodiment of the tracking marker.

FIG. 9 illustrates an exemplary embodiment of the tracking marker 102. The marker 102, in this embodiment, includes a base 110 with an elongated pole 112 extending upward therefrom. On the pole 112 are a plurality of tracking elements 114. The tracking elements 114 can include any number of different elements, including for example a sphere 116 and a cylinder 118. Another tracking element is a disc 120 including dimensional notations, such as notations 122 and 124.

The vertical placement of these elements 114 can be modified based on any number of factors, including positions assisting with post-processing integration operations as described in greater detail below. Moreover, the rotational notations 122 and 124 can provide for detecting changes in camera angles from the scene tracking marker 102 during filming. In one embodiment, the disc 120 allows for designation of a scaling factor between subsequent takes of the scene with character animation filming sequences.

It is recognized that any suitable type of elements 114 can be used, the above examples of spheres, tubes, and cylinders are exemplary and not expressly limiting. In one embodiment, the size and shapes of the tracking elements 114 provide improved ease of post-processing integration of various takes as described in greater detail below. For instance, different shapes and colors can assist the post-processing editor for manipulating or otherwise processing multiple takes into the subsequent composite track.

Figure 10:
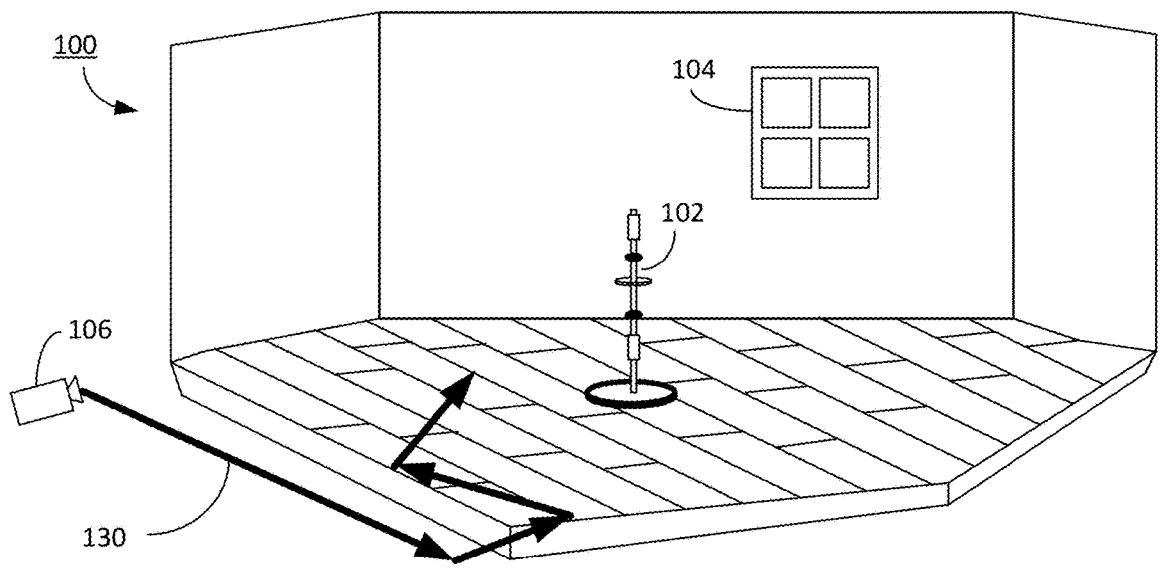
FIG. 10 illustrates filming a background scene with the tracking marker.

FIG. 10 illustrates a graphical representation of the filming or acquiring a background scene of the background set 100 using the hand-held camera 106. The background set 100 includes the tracking marker 102 and window 104. Using the hand-held camera 106 enables movement in all three planes, x, y, and z, as noted by movement directions 130. The 3D tracking data provides for the movement of the hand-held camera, the 3D tracking information usable for subsequent movements mirrored by the filming of the character(s) sequences.

For ease of illustration movement, the scene capture may include a camera operator (not shown) moving within the background set 100 following the movement directions 130. As the camera 106 moves in directions 130, the scene captures the marker 102 at varying angles and dimensions. These angles and dimensions can be noted as variations in x, y, and z coordinates or positions.

As a by-product of the movements 130 in FIG. 10, the position of the marker 102 relative to the window 104 changes. For example, as the camera 106 moves right, the window 104 in the background can move to the left of the marker 102. As the camera 106 moves closer to the marker 102, the window 104 may increase in size and fall outside of the frame.

Figure 11:
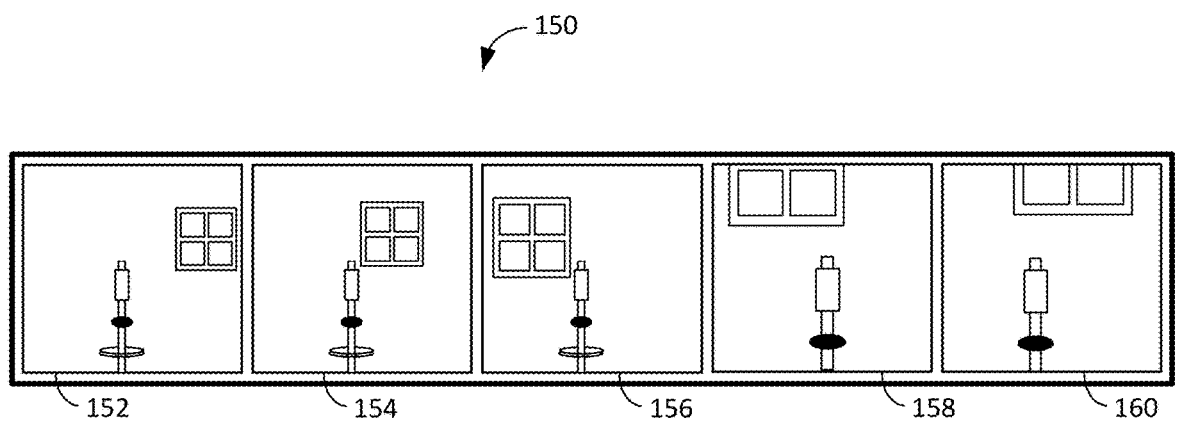
FIG. 11 illustrates a representation of the background scene.

This first take of the scene is the foundation, capturing the background for the scene. FIG. 11 illustrates a graphical illustration of the first take of the scene 150 visible in five exemplary frames. The first frame 152 shows the marker in a starting relation to the window. As the camera (106 of FIG. 10) moves right within the background set (100 of FIG. 10), a new representative frame 154 shows the window moving leftwards, just to the right of the marker. Continued rightward movement of the camera translates in the third frame 156 with the window now to the left of the marker.

As the camera moves closer to the marker, frame 158 shows enlargement of the marker and window. Then, frame 160 shows leftward movement of the camera, causing the window frame to move to the right of the marker.

Typically with a fixed camera, characters or elements are then filmed in greenscreen environment. Via post-processing, these characters or elements can be integrated into the background scene. By way of example, FIGS. 1-7 describe techniques for filming the scene(s) using greenscreen technology.

With low repeatability of moveable cameras, subsequent captures will include visual differences between shots. The present method and system solves problems of angles, dimensions, rotations, and other visual disparities found when integrating characters or elements into the first take of the scene acquired with a moveable camera.

In one embodiment, the scene tracking marker can be physically located on the background set as described above. In another embodiment, the scene tracking marker can be digitally inserted using video processing techniques. For example, a video overlay technology can include digitally placing a digital representation of the tracking marker in the first take of the scene, the scene tracking marker being in a fixed or moving location, for example fixed location can represent an animation moving in place and moving can represent the animation object in locomotion, e.g. walking.

Figure 12:
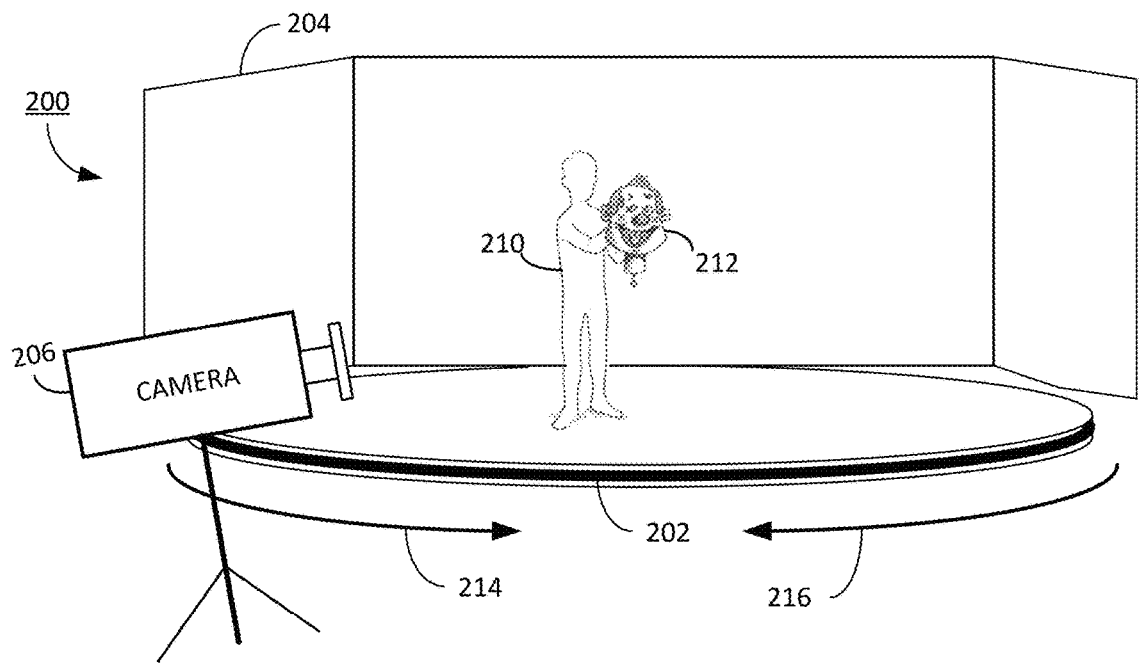
FIG. 12 illustrates a greenscreen set with a rotatable stage for capturing a character scene.

FIG. 12 illustrates a set 200 for capturing character scenes. This set 200 includes a rotatable stage 202 with a greenscreen background 204. A fixed camera 206 provides for scene capture including a puppeteer 210 holding a visual animation object, in this embodiment a puppet 212. In one exemplary embodiment, the puppeteer 210 wears a green skinsuit for blending into the greenscreen technology.

It is noted, the multiple takes of the scene may include any number of puppeteers, for example multiple puppeteers controlling various parts of a puppet. In another embodiment, the puppet may be segmented into components with multiple character scenes being shot using specific puppet components, for example a first character scene with a puppet's torso, a second character scene with a left arm, and so forth, such as using the puppet tracking marker(s) of FIGS. 1-7 above.

Prior to capturing the second and additional scenes, the camera movements (e.g. 130 of FIG. 10) are translated into a movement track. In one embodiment, the movement track is generated using a computer processing device performing a tracking operation by monitoring and recording the movement of the object from frame to frame. In one embodiment, the movements may also be translated into camera zoom movements.

The movement track represents the free movement of the camera in the background shot, this movement track is then translated for the fixed camera operating with the rotational stage. In one embodiment, the movement track is generated by a 3D tracking software that reads a sequence of frames and measures changes in position, zoom, rotation, and other factors of a selected element. In this embodiment, the selected element is the scene tracking marker.

The scene tracking marker (102 of FIG. 9) and the disc (120 of FIG. 9) can provide for scaling factors between the background and the visual animation object. For example, in one embodiment, the visual animation object is a puppet held by a puppeteer and at a 50% scale from the background. The disc can provide for computational analysis scaling a 1 inch disc relative to a 40 feet stage, this scaling allowing for adjustment of the stage rotation instructions. Where 3D tracking movement in the background is a first distance, this distance is then adjusted for the scaling factor. For example, if the camera moved 5 feet in the background scene, the stage may need to be rotated 18 degrees to represent this same distance. The disc then allows for scaling as necessary for adjusting the size of the character, such as a puppet element, for subsequent post-processing to have significantly accounted for rotational and dimensional adjustments within the scene.

The present system and method implements various embodiments for accounting for y-axis variations. In filming the background scene, the moveable camera can move in all three axes. By contrast, the fixed camera for filming the animation object scenes typically uses stage rotation for changes in the x axis and camera zoom for changes in the z axis. Therefore, one embodiment can include using a vertical track for adjusting the fixed camera up/down, changing the y-axis.

In another embodiment, the filming the background scene can include limited or imperceptible visual variations in the camera height, e.g. staying at eye level for the full scene.

Therefore, rotation of the stage 202, with the fixed camera 206, provides a high degree of repeatability for multiple takes of a scene. This repeatability allows for not only multiple takes of a single character scene, but also multiple takes with different elements of a character for subsequent combination in post-processing.

In one embodiment, stage rotations 214, 216, can be performed using one or more individuals pushing the stage in the various directions. The individuals can be in green skinsuits. In another embodiment, a motor or other mechanical means can be used to rotate the stage 202 during the filming process. For example, one embodiment may include a computerized motor rotating the stage or a portion of the stage based on timing instructions for scene capture.

In capturing takes of the scene with animation object(s), the puppeteer 210 moves or otherwise controls the puppet 212 while the stage 202 rotates. The camera 206 captures the character scene.

Stage rotations can include full rotation of the stage itself in response to mechanical movement instructions. For example, a computer processor may translate the movement track into rotational instructions for rotate the stage using any suitable rotation means, such as gears.

In another embodiment, rotation may relate to a single platform large enough to hold the puppeteer in a green suit, holding the puppet element. For example, a single platform can rest on the stage, the platform having a diameter large enough to safely hold the puppeteer, such as 12 inches to 36 inches. Using a smaller platform can thus reduce rotational torquer required to move the puppeteer for generating the visual animation.

In one embodiment, stage rotations can be further enhanced using a second camera positioned directly above the stage and using a scene tracking marker with a preset number of divisions. For example, in one embodiment, a disc may be used, having 32 circular markers, each designating 11.25 degrees of rotation. While capturing the animation object takes of the scene, the various divisions indicate representative stage rotation.

In the embodiment using stage rotation based on user rotations, the rotation instructions can be translating into an auditory click track, the one or more clicks translated by the individuals push the stage rotating in a clockwise or counterclockwise direction for a set number of clicks. For example, a high-pitch sound of 3 clicks can indicate rotating the stage three divisions, e.g. 33.75 degrees.

Where an overhead camera can track rotation, the handheld or moveable camera can also detect rotation based on noting the position of the circular markers around the outer edge of a circular disc, such as disc 120 with markers 122, 124 showing in FIG. 9.

Figure 13:
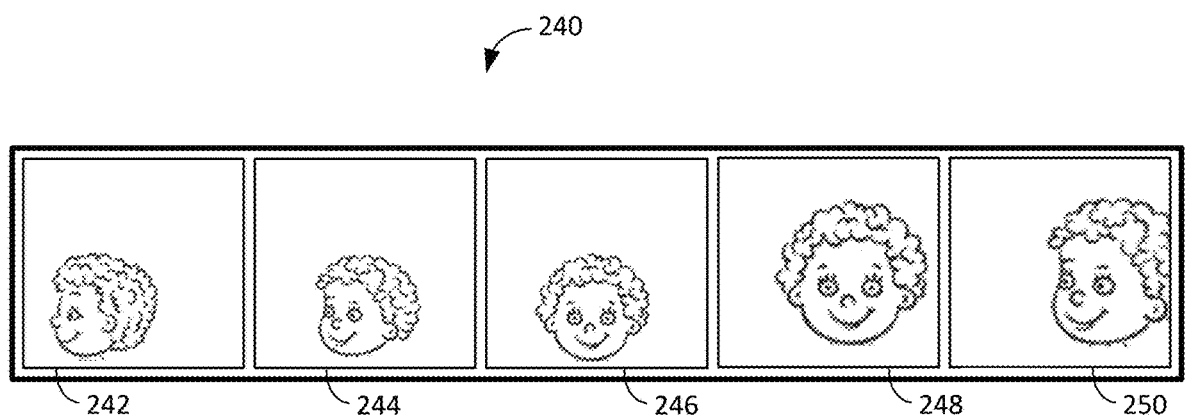
FIG. 13 illustrates a representation of a character scene.

FIG. 13 illustrates a graphical representation of a sample second take of the scene 240 using the puppet head as the visual animation object. For illustration purposes, the puppeteer 210 is omitted as not visible due to greenscreen technology. The first frame 242 shows the puppet head 212 in a first position. As the stage rotates, and the camera zooms, the head moves in different positions from frames 242, 244, 246, 248, and 250. This final frame 250 showing a close-up of the puppet head.

The changes in position in the character scene 240 may include rotational view. For example, starting in frame 242 with a front view of the head, with rotation around the head for a side view in frame 250. Where FIG. 13 illustrates a general representation of a take of the scene acquired under greenscreen technology using the rotating stage 202 of FIG. 5.

It is further noted that the method and system can acquire multiple numbers of takes of the scenes with different visual animation objects, including multiple puppet components or different puppets. For example, if a background scene has two puppets, the background scene may include two tracking markers, with different character scenes for the different puppets.

The method and system provides a high degree of repeatability between takes of animation object scenes, which are takes of the scene outside of the background or first take of the scene. With repeatability, this means that animators can capture multiple takes of a scene and those scenes can be readily integrated in post-processing without visual inconsistencies. As noted herein, this can include multiple takes with different elements of a visual animation object, for example a puppet head, hands, arms, torso, etc. These various elements and various takes can then be seamlessly integrated into a final or composite scene having visual consistencies. As used herein, visual inconsistencies includes disruptive visual artifacts that render the composite output visually unappealing.

With a high degree of repeatability between takes of a scene, one embodiment of the present method and system can include incorporating the method and system for generating a visual effect of object animation as described in U.S. Pat. No. 10,529,112, the disclosure of which is incorporated herein by reference. The visual effect of animation in U.S. Pat. No. 10,529,112 includes capturing multiple takes of a scene with the multiple objects representing different phases of an object action. For example, different phases of the object action can be include a puppet face generating a surprised reaction, therefore as the filming of multiple takes of the scene is highly repeatable, these scenes are captured with a high degree of conformity. Therefore, these multiple takes can be integrated in the post-processing environment without visual inconsistencies.

Figure 14:
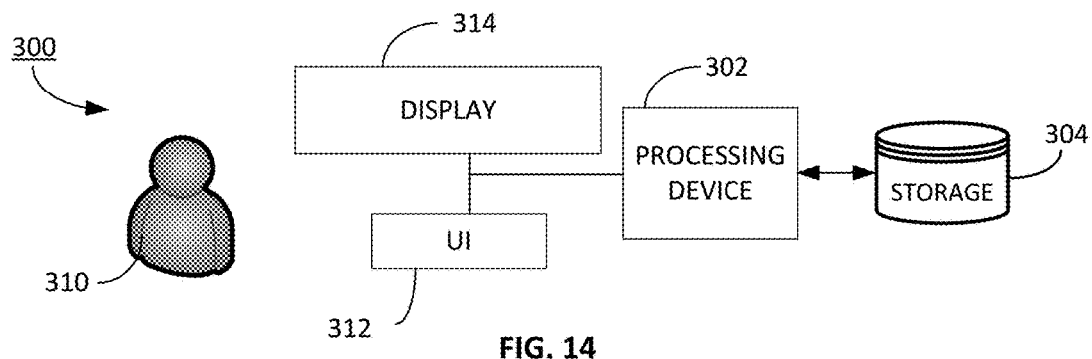
FIG. 14 illustrates a computer processing environment for post-processing operations.

The method and system includes post-processing operations for performing the integration of the background scene and character scene. The post processing operations may be performed using a computing system 300 of FIG. 14, including a processing device 302 with a storage device 304 associated therewith. The storage device 304 may include executable software instructions for the processing device, as well as including the first take of the scene and the second and further takes of the scene. A user 310 operates the processing device 302 via a user interface 312 with output generated on a display device 314. Technical processing operations executed by the user 310 can use similar post-processing computing solutions as noted above with respect to FIG. 7.

Via the processing device 302, the user 310 therein integrates the multiple takes of the scene. In one embodiment, the processing device operates any suitable commercially available post-processing software as recognized by one skilled in the art. Whereas, the character scenes, when captured, already take into account camera movements. Thus, elements with character scene are already captured with various camera angle and rotational factors.

It is noted, the user 310 may perform post-processing operations to supplement or augment positions or alignment issues for creating a seamless final scene. Where prior techniques would require the operator to estimate rotational and depth modifications to the character, these factors are already within the background scene.

Figure 15:
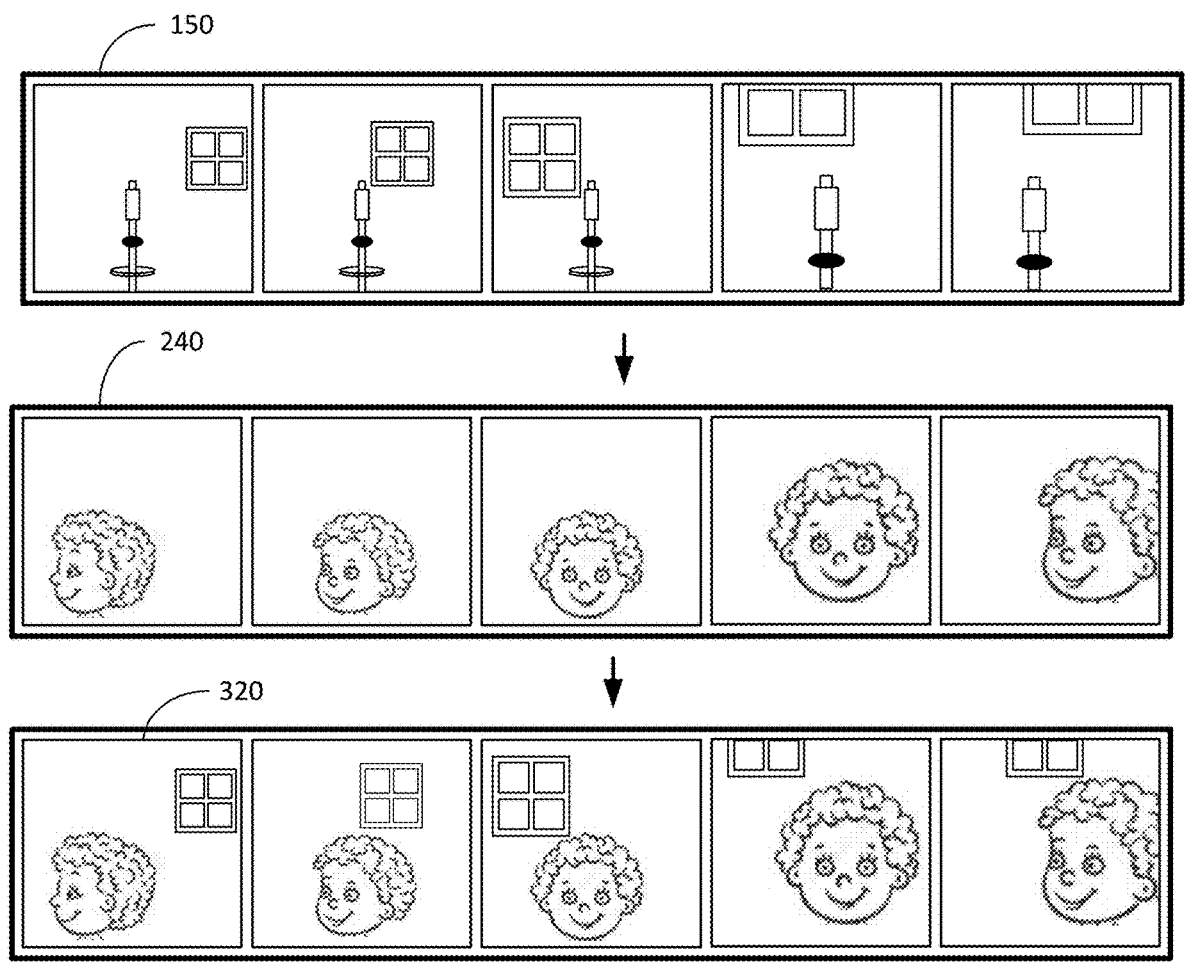
FIG. 15 illustrates a representation of the post-processing of the background scene of FIG. 11 and the character scene of FIG. 13.

FIG. 15 illustrates a graphical representation of the final scene 320 based on the post-processing integration of the first take of the scene 150 and the second take of the scene 240.

The above embodiments illustrate a sample first take of the scene as a background and the second take with a single puppet character element. It is recognized that the present method and system can utilized any number of takes and any number of different elements. For example, the first take of the scene may include two or more scene tracking markers. Then, in subsequent takes of the scene, different takes can have different puppeteers operating a first puppet for the first scene tracking marker and a second puppet for the second scene tracking marker. Additionally, if the puppet is composed of multiple elements, different takes can have these different elements with puppet tracking markers usable in conjunction with the scene tracking marker for final or composite scene generation.

Moreover, the method and system can then provide for generating a movie with multiple composite scenes generated using the above described techniques.

FIGS. 1 through 15 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for generating visual animation, the method comprising:
   capturing a first take of a scene with a moveable camera, the first take of the scene including a scene tracking marker disposed within a background set;
   determining a movement track of the moveable camera during the capturing of the first take of the scene;
   capturing a second take of the scene with a user operating a visual animation object on a moveable platform, capturing the second take using a fixed camera fixed in a non-moveable position and concurrently moving the moveable platform based on the movement track while capturing the second take of the scene with the fixed camera.

2. The method of claim 1 further comprising:
   electronically merging, using a computer processing device, the first take and the second take to generate an output scene.

3. The method of claim 1, wherein the movement track for the second take includes camera zoom instructions for the fixed camera.

4. The method of claim 1 further comprising:
   electronically inserting the scene tracking marker within the first take of the scene using a computerized video processing operation.

5. The method of claim 1, wherein the tracking marker includes a plurality of marker elements, the method further comprising:
   electronically processing the first take of the scene, using a computer processing device, and electronically determining the movement track based on the plurality of marker elements.

6. The method of claim 5, wherein one of the marker elements is a disc having a plurality of rotational notations thereon.

7. The method of claim 6, wherein the movement track includes rotation instructions for rotating the moveable platform, the rotation instructions generated based on the disc and the rotational notations.

8. The method of claim 1, wherein the visual animation object is at least a portion of a puppet.

9. A method for generating visual animation of a puppet character, the method comprising:
   capturing a first take of a scene with a moveable camera, the first take of the scene including a scene tracking marker disposed within a background set;
   determining a movement track of the moveable camera during the capturing of the first take of scene;
   capturing a second take of the scene with a first user operating a first portion of the puppet character including a first puppet tracking marker, capturing the second take using a fixed camera and moving a moveable platform based on the movement track;
   capturing a third take of the scene with a second user operating a second portion of the puppet character including a second puppet tracking marker using the fixed camera and moving the moveable platform based on the movement track; and
   electronically merging, using a computer processing device, the first take, the second take, and the third track to generate an output scene.

10. The method of claim 9, wherein the movement track for the second take includes camera zoom instructions for the fixed camera.

11. The method of claim 9, wherein the scene tracking marker includes a plurality of marker elements, the method further comprising:
electronically processing the first take of the scene, using a computer processing device, and electronically determining the movement track based on the plurality of marker elements.

12. The method of claim 11, wherein one of the marker elements is a disc having a plurality of rotational notations thereon, the movement track includes rotation instructions for rotating the moveable platform, the rotation instructions generated based on the disc and the rotational notations.

13. The method of claim 9 further comprising:
electronically inserting the scene tracking marker within the first take of the scene using a computerized video processing operation.

14. The method of claim 9 further comprising:
capturing the first take of the scene using a background set.

15. The method of claim 9 further comprising:
capturing the second take of the scene and the third take of the scene using greenscreen technology.

16. The method of claim 9, wherein the first tracking marker is located adjacent to a location where the second portion of the puppet character will connect with the first portion of the puppet character and the second marker is located adjacent to a location where the first portion of the puppet character will connect with the second portion of the puppet character.

17. A system for generating visual animation, the system comprising:
a background set having a scene tracking marker disposed therein, the scene tracking marker including a marker element disposed thereon, wherein the scene tracking marker is a disc having a plurality of rotational notations thereon;
a moveable camera operative to capture, a first take of a scene within the background set having the scene tracking marker therein;
a first processing device, in response to the first take of scene and the scene tracking marker captured therein, operative to determine a movement track of the moveable camera during the capturing of the first take of the scene;
a moveable platform having a greenscreen set disposed thereon and the moveable platform having an animation object controlled by a user therein;
a fixed camera operative to capture a second take of the scene with the user controlling the animation object, wherein the fixed camera capturing the second take of the scene is concurrent with moving the moveable platform based on the movement track; and
a second processing device electronically generating an output scene with visual animation by merging the first take of the scene and the second take of the scene.

18. The system of claim 17 further comprising:
the first processing device, in response to the first take of the scene, operative to determine camera zoom instructions for the fixed camera.

19. The system of claim 17, further comprising:
the movement track includes rotation instructions for rotating the moveable platform, the rotation instructions generated based on the disc and the rotational notations.

20. The system of claim 17 further comprising:
a third processing device operative to electronically insert the scene tracking marker within the first take of the scene using a computerized video processing operation.

* * * * *